(12) United States Patent
Muschaweck

(10) Patent No.: US 10,029,285 B2
(45) Date of Patent: Jul. 24, 2018

(54) GRILL SCRAPER APPARATUS

(71) Applicant: David Muschaweck, Simi Valley, CA (US)

(72) Inventor: David Muschaweck, Simi Valley, CA (US)

( * ) Notice: Subject to any disclaimer, the term of this patent is extended or adjusted under 35 U.S.C. 154(b) by 198 days.

(21) Appl. No.: 15/152,824

(22) Filed: May 12, 2016

(65) Prior Publication Data

US 2017/0326599 A1    Nov. 16, 2017

(51) Int. Cl.
*B08B 1/00* (2006.01)
*A47J 37/07* (2006.01)

(52) U.S. Cl.
CPC ........... *B08B 1/005* (2013.01); *A47J 37/0786* (2013.01)

(58) Field of Classification Search
CPC ...... A47J 37/0786; B08B 1/005; A47L 13/08; A47L 13/37; A47L 13/12
See application file for complete search history.

(56) References Cited

U.S. PATENT DOCUMENTS

| | | | |
|---|---|---|---|
| 6,000,739 A * | 12/1999 | Zemit | A47J 45/10 126/25 R |
| 8,683,641 B2 * | 4/2014 | Weinberger | A47J 43/288 15/104.001 |

* cited by examiner

*Primary Examiner* — Shay Karls
(74) *Attorney, Agent, or Firm* — Michael N. Cohen; Cohen IP Law Group PC

(57) ABSTRACT

A scraper for a barbeque grill comprises a handle. A substantially parallelepiped cleaning head is extended at a forward end of the handle. The cleaning head comprises a first metal plate and a second metal plate. A plurality of metal spikes is mounted to and extends from at least one surface of the cleaning head. The plurality of metal spikes move centrifugal swivel movement at an angle of 15 degrees for inserting into open spaces of the barbecue grill. The plurality of metal spikes provides side-to-side swinging motion to remove the charred debris from the top and side portions of the barbecue grill.

20 Claims, 5 Drawing Sheets

GRILL SCRAPER APPARATUS

CROSS-REFERENCE TO RELATED APPLICATIONS

Not Applicable.

STATEMENT REGARDING FEDERALLY SPONSORED RESEARCH AND DEVELOPMENT

Not Applicable.

Field of the Disclosure

The present embodiment relates in general to grill scrapers. More specifically, the present disclosure relates to a scraper with self-adjusting metal spikes that provides side-to-side swinging motion to remove the charred debris from the top and side portions of the barbecue grill.

Discussion of Related Art

Barbecue grill scrapers are commonly used as a simple tool for cleaning the metal grates or metal cooking surfaces of barbecue grills prior to and/or after cooking food on the grill surface. Historically grill brushes have been very effective in cleaning barbeque grills. However, problems can arise when utilizing the brush in a typical up and down cleaning motion which causes portions of the brush to come into contact with an extremely hot grill. Since virtually all brushes are manufactured of wood or molded plastic, whenever a portion of the plastic comes into contact with a hot grill, it at least partially melts. When this occurs, some of the bristles tend to fall out and the brush itself becomes less effective and unsightly.

Certain existing barbecue grill brushes vary in size, shape, and materials of construction. Some are equipped with various types of scrapers and the handles vary in length. Attempts have been made to overcome the problems to various degrees of success. However, using only the bristles and the scraper to clean the grill grate is often inadequate because residue, such as pieces of food and grease, are still present on the grill grate. In order to clean the residue off the grill grate, a separate scrubbing brush must be purchased and used to clean the grill grate, which is inconvenient and costly.

Conventional grill tools such as grill brushes and scrapers have not been designed to efficiently clean grill grates on the side surfaces of the grate. Such conventional cleaning implements are primarily utilized to brush or scrape only the top surface of the grate assembly. Typically, cleaning the side surface of the grates requires cumbersome techniques such as manually lifting the grill grate assembly and flipping it over to expose its side surface, and then manually scraping and brushing the exposed side surface.

Therefore, there is a need for a scraper with self-adjusting metal spikes that would provide side-to-side swinging motion to remove the charred debris from the top and side portions of the barbecue grill. Such needed metal spikes would provide centrifugal swivel movement at an angle of 15 degrees to enable it to reach the top and side portion of the barbecue grill. The present invention overcomes the existing shortcoming of current barbecue grill scrapers.

SUMMARY OF THE DISCLOSURE

The present embodiment is a scraper for cleaning a barbecue grill. The scraper comprises a handle, the handle is provided at the top thereof with a small opening. A wooden grip is mounted on an outer portion of the handle. The handle and the wooden grip are fastened utilizing a pair of first rivets. A substantially parallelepiped cleaning head is extended at a forward end of the handle. The cleaning head comprises a first metal plate and a second metal plate. The first metal plate, the second metal plate and the handle are fastened utilizing a plurality of second rivets. A plurality of metal spikes is mounted to and extends from at least one surface of the cleaning head. The plurality of metal spikes provides side-to-side swinging motion to remove the charred debris from the top and side portions of the barbecue grill. The plurality of metal spikes move centrifugal swivel movement at an angle of 15 degrees for inserting into open spaces of the barbecue grill.

The present invention discusses in detail utilizing the plurality of metal spikes to provide side-to-side swinging motion to remove the charred debris and residue remaining on the top and side portions of the barbecue grill.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

The following describes example embodiments in which the present invention may be practiced. This invention, however, may be embodied in many different ways, and the description provided herein should not be construed as limiting in any way. Among other things, the following invention may be embodied as methods or devices. As such, the present invention may take the form of an entirely hardware embodiment, an entirely software embodiment, or an embodiment combining software and hardware aspects. The following detailed descriptions should not be taken in a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
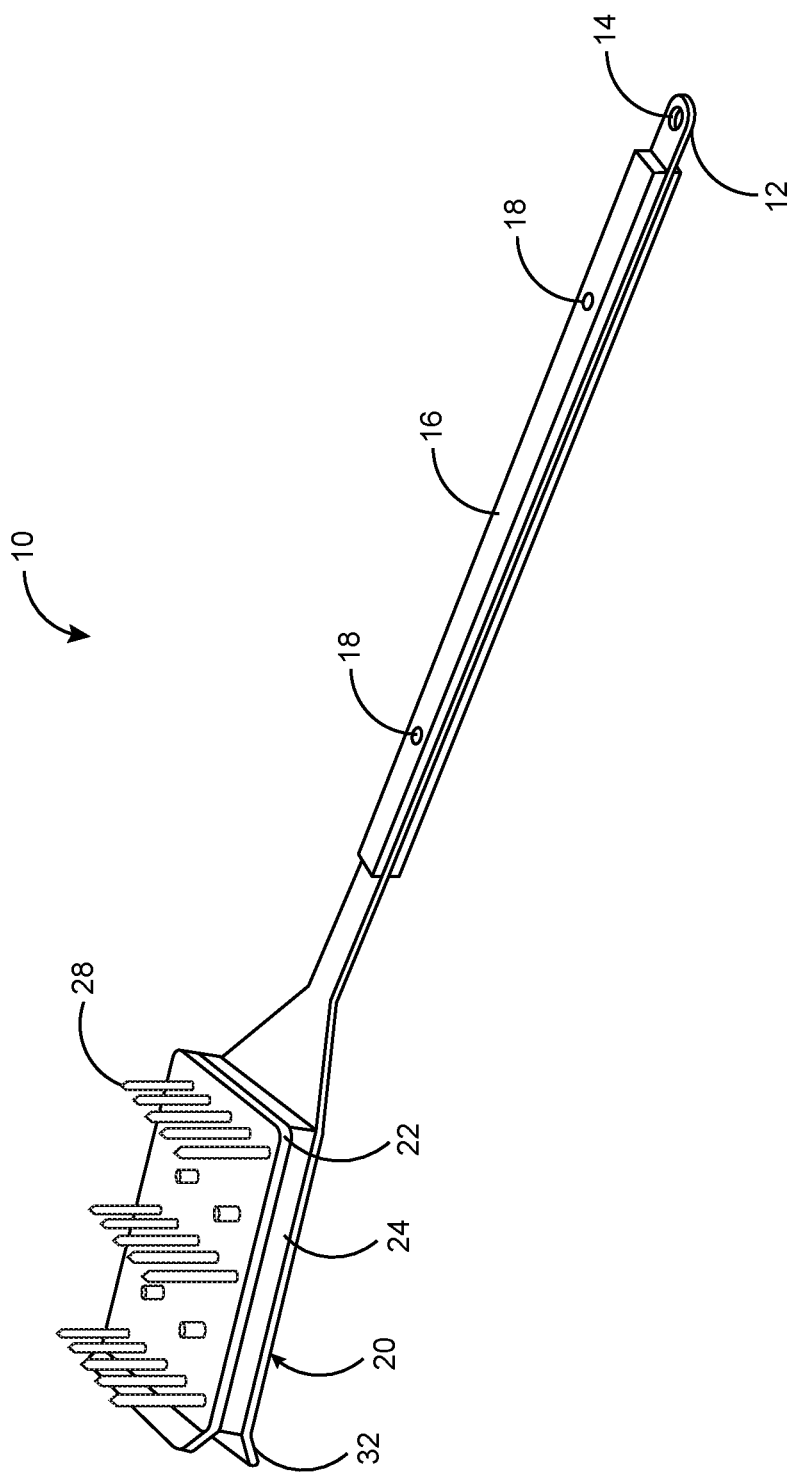
FIG. 1 illustrates a side perspective view of a scraper according to the preferred embodiment of the present invention.

Referring to FIG. 1 illustrates a side perspective view of a scraper 10 for a barbecue grill in accordance with the preferred embodiment of the present invention. The scraper 10 comprises a handle 12, the handle 12 is provided at the top thereof with a small opening 14 for hanging the scraper after use. A wooden grip 16 is mounted on an outer portion of the handle 12. Preferably, the handle 12 is made of stainless steel and may be of any desired length which preferably provides for maintaining a user's hand a safe distance from the surface of the barbecue grill 36 (see FIG. 5) should it be hot from use. The handle 12 and the wooden grip 16 are fastened utilizing a pair of first rivets 18. A substantially parallelepiped cleaning head 20 is extended at a forward end of the handle 12. The cleaning head 20 comprises a first metal plate 22 and a second metal plate 24. The first metal plate 22, the second metal plate 24 and the handle are fastened utilizing a plurality of second rivets 26. A plurality of metal spikes 28 is mounted to and extends from at least one surface of the cleaning head 20. The plurality of metal spikes 28 provides side-to-side swinging motion to remove the charred debris from the top and side portions of the barbecue grill 36. The plurality of metal spikes 28 provides centrifugal swivel movement at an angle of 15 degrees for inserting into open spaces of the barbecue grill 36 (see FIG. 5). A pair of secondary scraping edge 32 is formed thereof at least one corner of the cleaning head 20. The pair of secondary scraping edge 32 provides side-to-side movement at an angle of 45 degrees for drawn back and forth across a hot grilling surface to remove char and other debris from the grilling surface.

Figure 2:
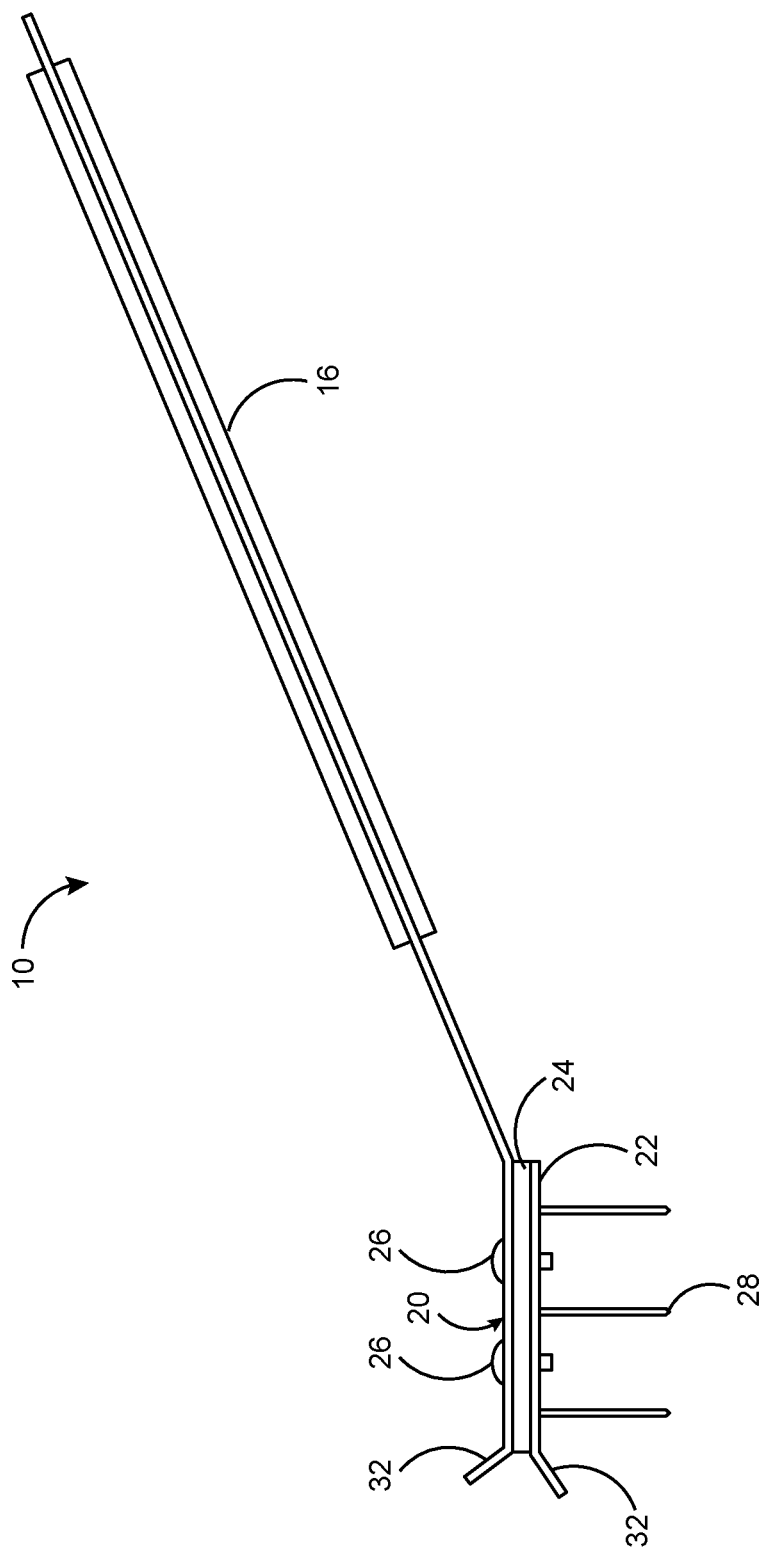
FIG. 2 illustrates a side view of the scraper according to the preferred embodiment of the present invention.
Figure 3:
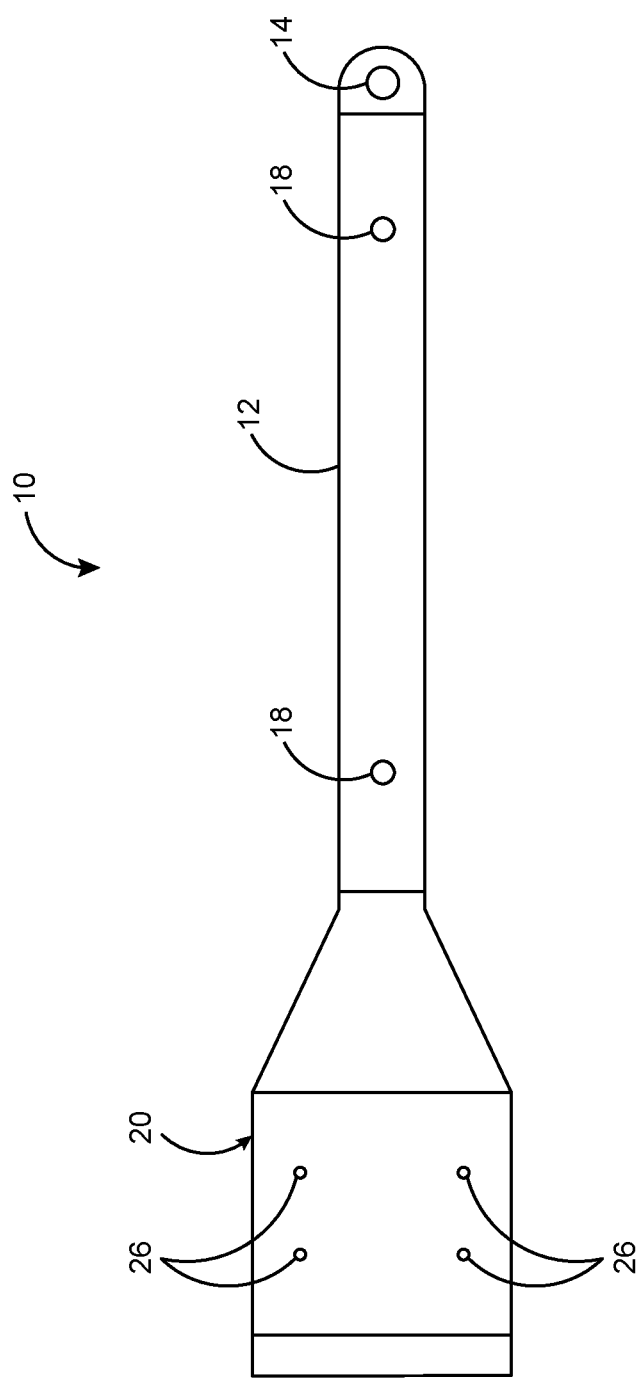
FIG. 3 illustrates a top view of the scraper according to the preferred embodiment of the present invention.

FIGS. 2 and 3 illustrate a side view and a top view of the scraper 10 in accordance with the preferred embodiment of the present invention. The scraper 10 comprises the handle 12. The wooden grip 16 is mounted on an outer portion of the handle 12. The handle 12 and the wooden grip 16 are fastened utilizing the pair of first rivets 18. The substantially parallelepiped cleaning head 20 is arranged at a forward end of the handle 12. The cleaning head 20 comprises the first metal plate 22 and a second metal plate 24. The first metal plate 22 is made of stainless steel and the second metal plate 24 is made of aluminum. The plurality of metal spikes 28 is mounted to and extends from at least one surface of the cleaning head 20. The plurality of metal spikes 28 are composed of stainless steel metal that enables to move centrifugal swivel movement at an angle of 15 degrees for inserting into open spaces of the barbecue grill 36. The pair of secondary scraping edge 32 is formed thereof at least one corner of the cleaning head 20. The pair of secondary scraping edge 32 provides side-to-side movement at an angle of 45 degrees for drawn back and forth across a hot grilling surface to remove char and other debris from the grilling surface. The width of the scraper 10 can vary depending on the spacing of a grill rod of the barbecue grill 36 with which the tool is contemplated to be used to clean. For example first metal plate 22, about 3/64" thick and a second metal plate 24, about 1/8" thick. The metal utilized in the present invention is selected from the group consisting of: iron, steel, zinc, galvanized metal, aluminum, stainless steel, rustless iron, lead, tin, terne plate, cadmium, nickel, copper and magnesium.

Figure 4:
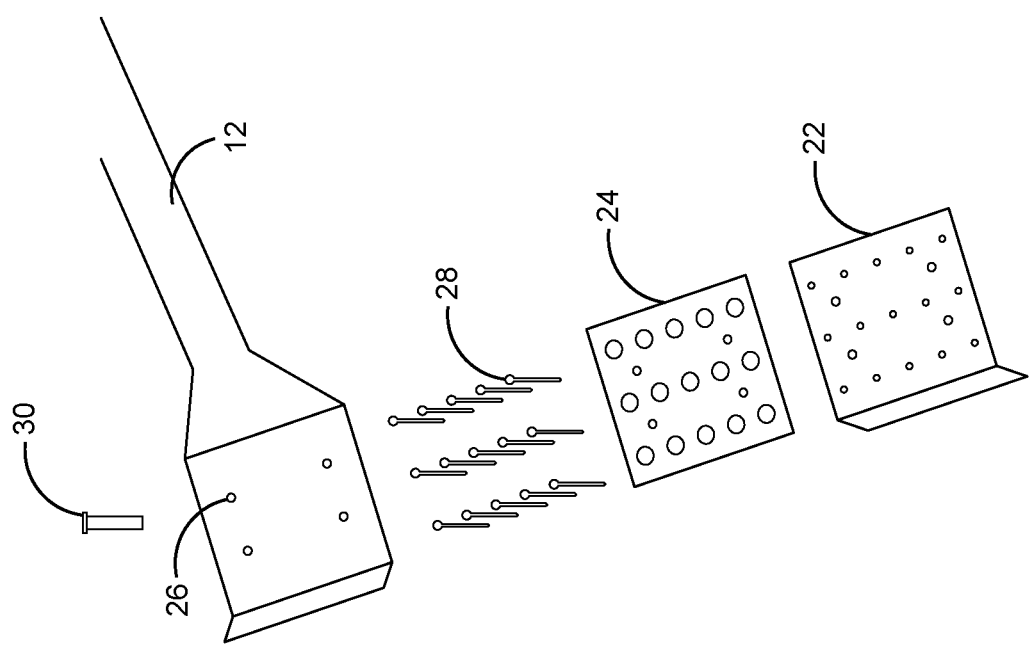
FIG. 4 illustrates an exploded view of the scraper according to the preferred embodiment of the present invention.

FIG. 4 illustrates an exploded view of the scraper 10 in accordance with the preferred embodiment of the present invention. The scraper 10 comprises the handle 12. The substantially parallelepiped cleaning head 20 is extended at the forward end of the handle 12. The cleaning head 20 comprises the first metal plate 22 and the second metal plate 24. The plurality of metal spikes 28 is mounted to and extends from at least one surface of the cleaning head 20.

Figure 5:
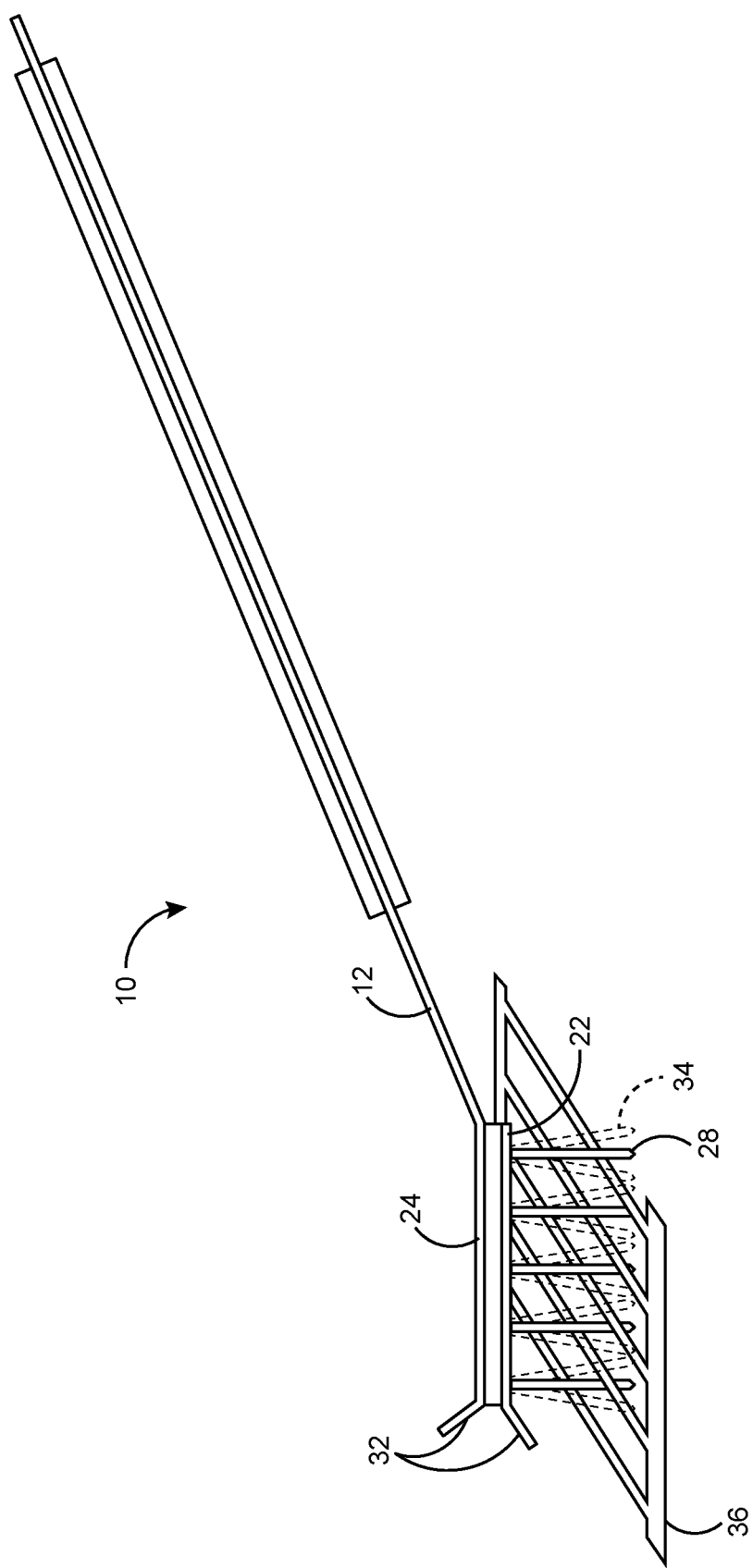
FIG. 5 illustrates a side view of the scraper in use.

FIG. 5 illustrates a side view of the scraper 10 in use. A person can place the scraper 10 on the barbecue grill 36 prior to removing charred debris left on the barbecue grill 36. As shown, the plurality of metal spikes 22 are inserted into open spaces of the barbecue grill 36 to contact side surfaces of metal bars of the barbecue grill 36 thereof contact top surfaces of the metal bars of the barbecue grill 36 respectively. As a result, the plurality of metal spikes 28 would provide centrifugal swivel movement 34 at an angle of 15 degrees that enable to remove the charred debris and residue remaining on the top and side portions of the barbecue grill 36.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A scraper for a grill, comprising:
a handle;
a substantially parallelepiped cleaning head at a forward end of the handle, the cleaning head comprising:
a plurality of rigid metal spikes mounted to and extending from at least one surface of the cleaning head;
whereby, the plurality of metal spikes provides side-to-side swinging motion to remove debris from the top and side portions of the grill.

2. The scraper of claim 1 wherein the plurality of metal spikes move in a centrifugal swivel movement.

3. The scraper of claim 1 further comprising a wooden grip mounted on an outer portion of the handle.

4. The scraper of claim 1 wherein the handle is provided at a top thereof with a small opening.

5. The scraper of claim 1 wherein the handle is made of stainless steel.

6. The scraper of claim 1 wherein the first metal plate is made of stainless steel.

7. The scraper of claim 1 wherein the second metal plate is made of aluminum.

8. The scraper of claim 1 wherein the plurality of rigid metal spikes are at least partially formed of stainless steel.

9. The scraper of claim 1 further comprising a scraping edge configured with the cleaning head.

10. A scraper for a grill, comprising:
a handle;
a substantially parallelepiped cleaning head at a forward end of the handle, the cleaning head comprising:
a first metal plate and a second metal plate; and a plurality of rigid metal spikes mounted to and extending from at least one surface of the cleaning head, the plurality of rigid metal spikes configured to move in a centrifugal swivel movement;

whereby, the plurality of metal spikes provides side-to-side swinging motion to remove debris from the top and side portions of the grill.

11. The scraper of claim 10 wherein the handle is made of stainless steel.

12. The scraper of claim 10 wherein the first metal plate is made of stainless steel.

13. The scraper of claim 10 wherein the second metal plate is made of aluminum.

14. The scraper of claim 10 wherein the plurality of rigid metal spikes are at least partially formed of stainless steel.

15. The scraper of claim 10 further comprising a scraping edge configured with the cleaning head.

16. A scraper for a grill, comprising:

a handle;

a substantially parallelepiped cleaning head at a forward end of the handle, the cleaning head comprising:
a first metal plate and a second metal plate;
a plurality of rigid metal spikes mounted to and extending from at least one surface of the cleaning head; the plurality of rigid metal spikes configured to move in a centrifugal swivel movement; and
a scraping edge;

whereby the plurality of metal spikes provides side-to-side swinging motion to remove debris from the top and side portions of the grill.

17. The scraper of claim 16 wherein the handle is made of stainless steel.

18. The scraper of claim 16 wherein the first metal plate is made of stainless steel.

19. The scraper of claim 16 wherein the second metal plate is made of aluminum.

20. The scraper of claim 16 wherein the plurality of rigid metal spikes are at least partially formed of stainless steel.

* * * * *